Figures 1, 2, 3:
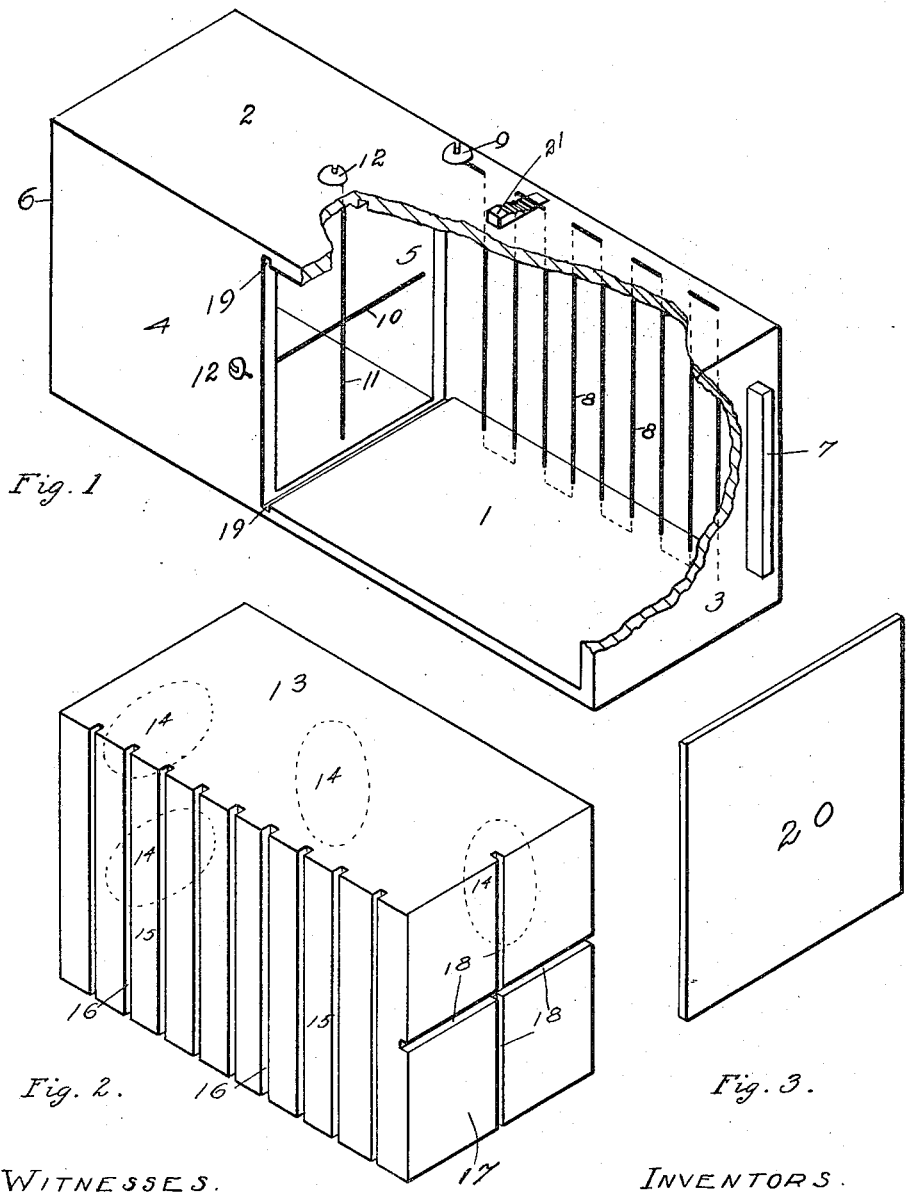

R. N. & L. R. VAN SANT.
DEVICE FOR CUTTING BUTTER AND THE LIKE.
APPLICATION FILED FEB. 23, 1911.

1,069,591. Patented Aug. 5, 1913.

WITNESSES.

INVENTORS.
RALPH N. VAN SANT and
LEPORT R. VAN SANT.

By Chas. W. La Porte
Atty.

UNITED STATES PATENT OFFICE.

RALPH N. VAN SANT AND LEPORT R. VAN SANT, OF PEORIA, ILLINOIS.

DEVICE FOR CUTTING BUTTER AND THE LIKE.

1,069,591. Specification of Letters Patent. Patented Aug. 5, 1913.

Application filed February 23, 1911. Serial No. 610,177.

*To all whom it may concern:*

Be it known thae we, RALPH N. VAN SANT and LEPORT R. VAN SANT, citizens of the United States, residing at Peoria, in the county of Peoria and State of Illinois, have invented certain new and useful Improvements in Devices for Cutting Butter and the Like, of which the following is a specification.

This invention relates to devices for cutting butter and similar soft and easily divided substances into small individual pats or portions of uniform and symmetrical shape.

The object of the invention is to provide a simple, durable and expeditiously operating device for cutting up prints or blocks of butter into a number of smaller blocks or portions such as are generally served at the dining-table.

A further object is to provide a device of the character indicated which is adapted to operate on bulk butter as expeditiously as on print butter.

With the above and such other objects as may hereinafter appear, the invention consists in the construction, combination and arrangement of parts, as hereinafter described and then sought to be defined by the appended claims, reference had to the accompanying drawing forming a part hereof and in which—

Figure 1 is a view in perspective, portions being cut away, of the cutting casing, illustrated as resting on one of its sides: Fig. 2 is a view in perspective of the forcing or follower block: and Fig. 3 is a similar view of what we term the packing plate to be used when bulk butter is to be cut.

In Fig. 1 is shown the cutting device which comprises a casing of general hollow-box formation having continuous sides 1 and 2, a closed end 3, and top and bottom portions 4 and 5, respectively, which extend only a portion of the length of the casing leaving openings of substantially the length of the ordinary pound print of butter. These openings are adjacent the closed end 3. The opposite end at 6 is open to permit the insertion of the butter which is to be divided. On the closed end 3, removed a slight distance from the bottom, is provided the horizontally extending lug 7 which is adapted to rest upon the edge of a bowl of ice water into which the individual portions of the material are to be dropped and from which they are served. The bottom 5 of the casing rests on the edge of the bowl opposite the place on which the lug 7 rests and thus the cutting device is simply and conveniently supported in position for use.

Parallelly threaded back and forth across the open portion of the bottom of the casing is the cutting wire 8 which is secured by screws, one of which is shown at 9. The various opposing runs of the wire are positioned apart a distance equal to the desired thickness of the blocks or portions of butter to be obtained. It is obviously an equivalent construction wherein the transverse wires are separately and individually secured in position, but it is to be understood that the manner shown is the preferred one and that the individual wires are considered a modified form. These wires form the cutting means for cutting the blocks transversely into portions of the desired thickness.

Secured to the top and bottom, and sides of the casing adjacent the inner ends of the top and bottom plates 4 and 5 are the wires 10 and 11 secured by fastening means 12. These wires are positioned at right angles to each other and extend centrally across the interior of the casing from top to bottom and side to side intersecting at a central point of the interior of the casing. These wires constitute the means for dividing the block of butter longitudinally into four oblong portions, square in cross section, the point of intersection of the wires cutting the block centrally.

For use in connection with the cutting casing, above described, is provided the forcing or follower block 13 which is formed in one end and one side with the finger holes 14 to assist in ready manipulation thereof. This block is oblong in shape and preferably square in cross section to fit readily into and slide endwise in the casing through the open portion 6. It is also of a length equal to the extent of the open portion of the top of the casing and is designed to slide downwardly into the casing through said open top portion. One of the sides 15 of the block are formed with slots or grooves 16 corresponding in number and adapted to register with the bottom wires 8, while one end 17 thereof is similarly formed with the intersecting slots or grooves 18 corresponding to and adapted to register with the wires 10 and 11.

The operation of the device, above described, is as follows:—The print or block of butter to be cut is inserted into the casing through the open end portion at 6, the device having been positioned over the bowl of ice water as described. The block 13 is then taken by hand and placed in the casing after the block of butter with the end portion 17 first. Upon the application of pressure endwise to the block 13, the print of butter is moved toward and to the closed end 3 of the casing, during which movement the butter is divided into four oblong blocks by being subjected to the action of the intersecting wires 10 and 11, as is readily understood. At the end of this movement the wires 10 and 11 will pass into the grooves 18 and thus the last portion of the print of butter will be completely severed. The forcing or follower block 13 is then withdrawn and placed with the side 15 downward on top of the butter which is exposed at the open portion of the top of the casing. Upon the application of pressure downwardly to the block 13 the butter is forced past the wires 8 and drops into the bowl of water, which is beneath the device, in the form of small individual portions or pats of a size and shape as is usually served at the dining table. The wires 8 enter the grooves 16 and the butter is completely severed and drops readily. When print or block butter is not available, this device may be readily utilized in the cutting of bulk butter into the small portions or pats desired. For this purpose grooves 19 are formed in the sides 1 and 2 of the casing immediately adjoining the extremities of the top and bottom plates 4 and 5. Adapted to fit into and slide in these grooves is the rectangular packing plate 20, shown in Fig. 3. This packing plate 20 is placed in the casing by fitting it in the grooves 19 and forms a packing base whereon the bulk butter may be packed. The bulk butter is packed in through the open end 6 of the casing onto the plate 20 as a base and when this portion of the casing is completely filled with a compact mass of butter, the packing plate 20 is removed and by the manipulation of the block 13 the operations above described in reference to print butter are carried out and the butter divided into the desired individual portions or pats.

It is obvious that we have provided a device which may be used to divide either print or bulk butter expeditiously into the small individual pats for serving, which eliminates, as far as possible, the necessity of handling the product and delivers it into the ice water bowl from which it is to be served with no intermediate handling.

The device is readily cleaned owing to its few simple parts, will not get out of order readily owing to the simplicity of its construction and is inexpensive to manufacture for the same reason. The only difficulty possible with this device would arise by the accidental breakage of the cutting wires, but this should occur only after long continued use. It is, however, a very simple matter to rewire the device properly and this does not constitute a material objection to the practicability and efficiency of the device.

While we have described the device as particularly for use in cutting butter it is obvious and to be understood that it is adapted to be used in dividing any other soft or plastic substance such as soap, etc., which it may be desirable to use in small portions.

It is to be understood that, while we disclose this as the preferred embodiment of our invention, this disclosure is merely illustrative thereof, and we do not wish to be understood as limiting ourselves to the exact details and construction shown, as such changes and modifications may be made in practice as fall within the scope of the claims without digressing from the inventive idea which is set forth therein.

In case the cutting wires 8 should become loose we provide a tensioning device 21 in the form of a wedge having a notched face to engage the loops of the wire. As many of these may be used as desirable.

Having described our invention, what we claim and desire to secure by Letters Patent is:—

1. In a device of the character described, a casing having two portions, one of said portions being inclosed and having longitudinal cutting means, the other of said portions of said casing having an open bottom and transverse cutting means extending across said open bottom.

2. In a device of the character described, a casing formed in two parts, one of said parts being inclosed and having longitudinal cutting means located in proximity to one end thereof, the other of said parts having its top and bottom portions open and also having transverse cutting means secured to the sides thereof and extending across said open bottom portion.

3. In a device of the character described, a casing formed of two parts, one of said parts being inclosed, longitudinal cutting means comprising wires intersecting at right angles to each other and located in proximity to the inner end of said inclosed portion, the other part of said casing having its top and bottom portions open, and wires secured to the sides thereof and extending in spaced parallel relation across said open bottom portion to form transverse cutting means.

4. In a device of the character described, a casing having one end open and one end closed and formed in two parts, one of said parts being inclosed and provided with longitudinal cutting means, the other of said parts having open top and bottom portions and transverse cutting means extending across said open bottom portion, a lug or projection on said closed end to provide a supporting means for said device.

5. In a device of the character described and in combination, a casing having an inclosed portion provided with longitudinal cutting means and an open top and bottom portion having transverse cutting means and a follower block adapted to enter said inclosed portion to subject the material to the action of the longitudinal cutting means and also adapted to enter the open top portion to subject the material to the transverse cutting means.

6. In a device of the character described, a casing formed in two parts, one of said parts being inclosed and having longitudinal cutting means near one end thereof, the other of said parts of said casing having its bottom and top portions open, transverse cutting means extending across said open bottom portion, grooves formed in the opposite sides of said casing at one end of said inclosed part, and a rectangular plate adapted to fit and slide in said grooves.

7. In a device of the character described, in combination, a cutter casing rectangular in form and having one end open and one end closed, said closing also having open top and bottom portions adjacent said closed end, longitudinal cutting means located approximately centrally of said casing near said open portions, and transverse cutting means extending across said open bottom portion.

8. In a device of the character described, in combination, a cutter casing rectangular in form and having one end open and one end closed, said casing also having open top and bottom portions adjacent said closed end, longitudinal cutting means located approximately centrally of said casing near said open bottom portions, and transverse cutting means extending across said open bottom portion, and a follower block shaped in vertical transverse section to fit into said casing endwise and in horizontal longitudinal section to fit into said casing through said open top portion.

In testimony whereof we affix our signatures, in presence of two witnesses.

RALPH N. VAN SANT.
LEPORT R. VAN SANT.

Witnesses:
HIRAM E. TODD,
HAYES PARK.

Copies of this patent may be obtained for five cents each, by addressing the "Commissioner of Patents, Washington, D. C."